United States Patent

Sano et al.

[11] Patent Number: 5,305,665
[45] Date of Patent: Apr. 26, 1994

[54] SPEED CHANGE CONTROL DEVICE OF AUTOMATIC TRANSMISSION

[75] Inventors: Kunihiko Sano; Mitsugi Tazawa, both of Shizuoka, Japan

[73] Assignee: Jatco Corporation, Fuji, Japan

[21] Appl. No.: 939,600

[22] Filed: Sep. 2, 1992

[51] Int. Cl.⁵ .............................................. F16H 61/00
[52] U.S. Cl. ...................................................... 74/869
[58] Field of Search ............ 74/869, DIG. 1; 475/61, 475/64, 116

[56] References Cited

U.S. PATENT DOCUMENTS

| | | | |
|---|---|---|---|
| 4,501,175 | 2/1985 | Tatsumi | 74/869 |
| 4,555,964 | 12/1985 | Sugano | 74/869 |
| 4,783,743 | 11/1988 | Yashiki et al. | 475/61 X |
| 4,831,900 | 5/1989 | Yamamoto et al. | 74/869 |
| 4,843,920 | 7/1989 | Hayasaki et al. | 74/869 |
| 5,020,393 | 6/1991 | Kuwayama et al. | 74/869 |
| 5,083,481 | 1/1992 | Smith et al. | 74/869 |
| 5,090,271 | 2/1992 | Hayaski | 74/869 |
| 5,094,130 | 3/1992 | Hirose et al. | 74/869 |

FOREIGN PATENT DOCUMENTS 58-27419  6/1983  Japan.
2057602  4/1981  United Kingdom .................. 74/869

*Primary Examiner*—Dirk Wright
*Attorney, Agent, or Firm*—Foley & Lardner

[57] ABSTRACT

A speed change control device for an automatic transmission is shown which comprises first, second and third shift valves, each having two switching positions for selectively carrying out application and releasing of hydraulic pressure to and from an oil chamber of a hydraulically operated friction element. First and second solenoid valves are employed each controlling an output of hydraulic pressure in accordance with an electric signal applied thereto. The first solenoid valve outputs a hydraulic pressure for controlling the switching operation of the second shift valve, and the second solenoid valve outputs a hydraulic pressure for controlling the switching operation of the first shift valve. A passage structure is further employed which applies the hydraulic pressure from the second solenoid valve to the third shift valve to control the switching operation of the same only when the second shift valve assumes one given position.

9 Claims, 4 Drawing Sheets

FIG. 3

| | CLUTCH (20) | CLUTCH (22) | BRAKE (26) | ONE-WAY CLUTCH (30) | BRAKE (28) | CLUTCH (32) | BRAKE (33) |
|---|---|---|---|---|---|---|---|
| 1'st SPEED | — | ○ | (○)※ | ○ | — | — | ○ |
| 2'ND SPEED | — | ○ | — | — | ○ | — | ○ |
| 3'RD SPEED | ○ | ○ | — | — | — | — | ○ |
| 4'TH SPEED | ○ | ○ | — | — | — | ○ | — |
| REVERSE | ○ | — | ○ | — | — | — | ○ |

※ : ENGAGED IN ONLY L-RANGE

FIG. 4

| | 1'st SPEED | 2'ND SPEED | 3'RD SPEED | 4'TH SPEED | REVERSE |
|---|---|---|---|---|---|
| SOLENOID VALVE (50) | ON | ON | OFF | OFF | OFF |
| SOLENOID VALVE (52) | ON | OFF | OFF | ON | OFF |
| 1-2 SHIFT VALVE (54) | ON | OFF | OFF | ON | OFF |
| 2-3 SHIFT VALVE (56) | ON | ON | OFF | OFF | OFF |
| 3-4 SHIFT VALVE (58) | OFF | OFF | OFF | ON | ON |
| SERVO-APPLY CHAMBER S/A | — | ○ | ○ | — | — |
| SERVO-RELEASE CHAMBER S/R | — | — | ○ | ○ | — |
| FORWARD CLUTCH (22) | ○ | ○ | ○ | ○ | — |
| HIGH CLUTCH (20) | — | — | ○ | ○ | ○ |
| LOW & REVERSE BRAKE (26) | — | — | — | — | ○ |
| DIRECT CLUTCH (32) | — | — | — | ○ | — |
| REDUCTION BRAKE (33) | ○ | ○ | ○ | — | ○ | ly, it is necessary to provide fluid
SPEED CHANGE CONTROL DEVICE OF AUTOMATIC TRANSMISSION

BACKGROUND OF THE INVENTION

1. Field of the Invention

The present invention relates in general to automatic transmissions and more particularly to speed change control devices of such automatic transmissions.

2. Description of the Prior Art

In order to clarify the task of the present invention, one conventional speed change control device disclosed in Japanese Patent Second Provisional Publication No. 58-27419 will be described.

The speed change control device is designed for an automotive automatic transmission having four forward speeds and one reverse. The speed control device has three shift valves, which are a 1-2 shift valve, a 2-3 shift valve and a 3-4 shift valve. These three shift valves are subjected to a position change due to a hydraulic pressure supplied from first and second solenoid valves. In particular, the hydraulic pressure from the first solenoid valve is applied to the 2-3 shift valve to carry out position change of that shift valve, while the hydraulic pressure from the second solenoid valve is applied to both the 1-2 and 3-4 shift valves. However, the application of hydraulic pressure to these two shift valves from the second solenoid valve does not always induce a change in the position of these two valves. More specifically, when the 2-3 shift valve assumes a second speed position, the hydraulic pressure from the second solenoid valve changes the position of only the 1-2 shift valve. In this case, the position of the 3-4 shift valve is not changed. In other words, when the 2-3 shift valve assumes the second speed position, the hydraulic pressure application to the 3-4 shift valve from the second solenoid valve is made through the 2-3 shift valve, thereby fixing or maintaining the existing position of the 3-4 shift valve. When the 2-3 shift valve assumes a third speed position, the hydraulic pressure from the second solenoid valve changes the position of only the 3-4 shift valve. In this case, the position of the 1-2 shift valve is not changed. That is, when the 2-3 shift valve assumes the third speed position, the hydraulic pressure application to the 1-2 shift valve from the second solenoid valve is made through the 2-3 shift valve thereby to fix or keep the existing position of the 1-2 shift valve. With this arrangement, the 1-2 speed change and the 3-4 speed change are controlled by the second solenoid valve.

However, due to an inevitable increase in size of the 2-3 shift valve, the above-mentioned conventional speed change control device is forced to have a complicated and bulky construction. That is, in addition to its essential function by which the hydraulic pressure application to the 2-3 shift valve is switched, the 2-3 shift valve needs an additional function by which the hydraulic pressure for suppressing the position change of the 1-2 and 3-4 shift valves is outputted at the second and third speed positions of the 2-3 shift valve, respectively. Furthermore, it is necessary to provide fluid passages for fluidly connecting the 2-3 shift valve to both the 1-2 shift valve and the 3-4 shift valve. This also contributes to the bulky construction of the speed change control device.

SUMMARY OF THE INVENTION

It is therefore an object of the present invention to provide a speed change control device of an automatic transmission which is simple in construction and compact in size.

According to a first aspect of the present invention, there is provided a speed change control device for an automatic transmission which comprises first, second and third shift valves, each having two switching positions for selectively carrying out application and releasing of hydraulic pressure to and from an oil chamber of a hydraulically operated friction element. The first and second solenoid valves each control an output of hydraulic pressure in accordance with an electric signal applied thereto, the first solenoid valve outputting a hydraulic pressure which is applied to the second shift valve to control the switching operation of the same, and the second solenoid valve outputting a hydraulic pressure which is applied to the first shift valve to control the switching operation of the same. Means are provided for applying the hydraulic pressure from the second solenoid valve to the third shift valve to control the switching operation of the same only when the second shift valve assumes one of the switching positions.

According to a second aspect of the present invention, there is provided a speed change control device for use in a four forward speeds and one reverse type automatic transmission including a torque converter, a main speed change mechanism and an auxiliary speed change mechanism. The speed change control device comprises a band brake, installed in the main speed change mechanism, which includes a servo-apply chamber when fed with a hydraulic pressure, the servo-apply chamber can induce the second speed of the transmission. The band brake further includes a servo-release chamber which, when fed with the hydraulic pressure, can induce the third speed of the transmission. Additionally, 1-2, 2-3 and 3-4 shift valves are provided each having two switching positions for selectively carrying out application and releasing of hydraulic pressure to and from an oil chamber of a hydraulic operated friction element, the 1-2 shift valve having such a position as to feed the servo-apply chamber with a hydraulic pressure. The device further comprises electrically actuated first and second solenoid valves, the first solenoid valve outputting a hydraulic pressure which is applied to the 2-3 shift valve to control the switching operation of the same, the second solenoid valve outputting a hydraulic pressure which is applied to the 1-2 shift valve to control the switching operation of the same; and passage means for feeding the 3-4 shift valve with the hydraulic pressure from the second solenoid valve to control the switching operation of the 3-4 shift valve only when the 2-3 shift valve assumes such a given position as to feed said servo-release chamber with the hydraulic pressure.

BRIEF DESCRIPTION OF THE DRAWINGS

Other objects and advantages of the present invention will become apparent from the following description when taken in conjunction with the accompanying drawings, in which:

FIG. 3 is a table showing ON-OFF conditions of various friction elements of the speed change control device taken when an associated transmission assumes various speeds; and FIG. 4 is a table showing ON-OFF, applied-released and engaged-disengaged conditions of various elements of the speed change control device taken when the associated transmission assumes various speeds.

DETAILED DESCRIPTION OF THE INVENTION

Figure 2:
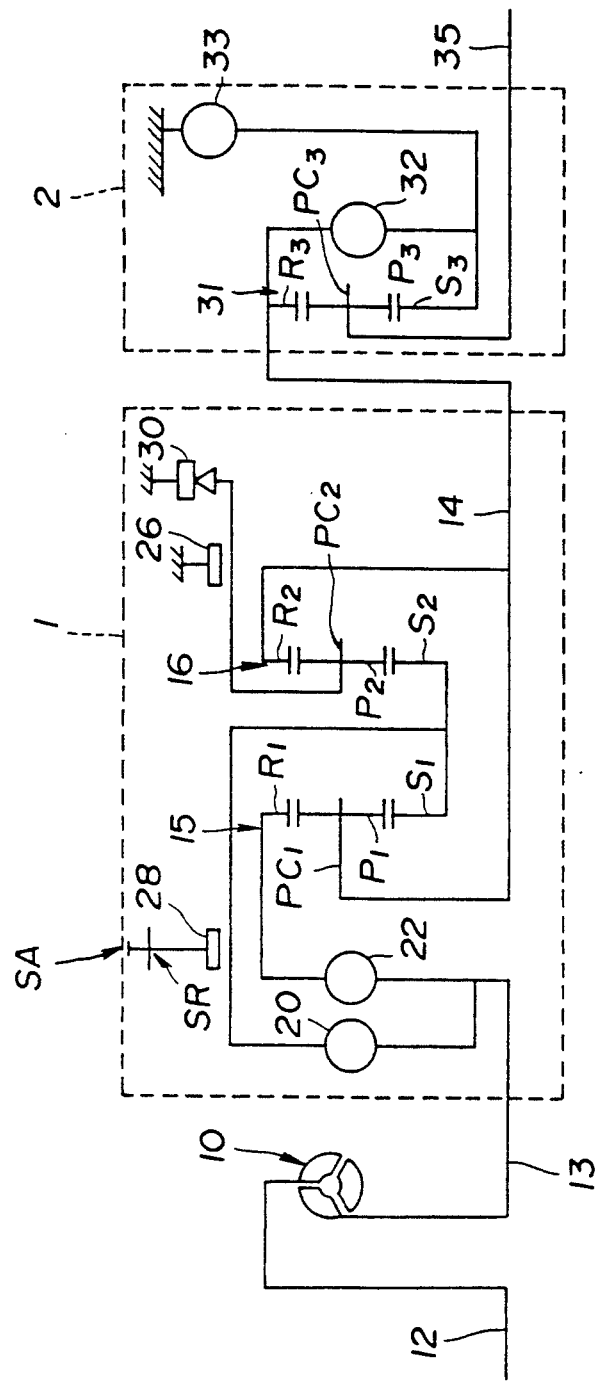
FIG. 2 is a skeleton drawing of an automatic transmission to which the present invention is practically applicable.

Referring to FIG. 2, there is schematically shown a power transmission mechanism of an automatic transmission to which the present invention is practically applicable.

The power transmission mechanism comprises generally a torque converter 10, a main speed change mechanism 1 and an auxiliary speed change mechanism 2.

The torque converter 10 transmits the torque of an engine output shaft 12 to an input shaft 13 while converting the same.

The main speed change mechanism 1 comprises the input shaft 13, an intermediate shaft 14 for transmitting a drive force to the auxiliary speed change mechanism 2, a first planetary gear unit 15, a second planetary gear unit 16, a high clutch 20, a forward clutch 22, a low-and-reverse brake 26, a band brake 28 and a low one-way clutch 30. The first planetary gear unit 15 comprises a sun gear S1, an internal gear R1, pinion gears P1 meshed with both the sun and internal gears S1 and R1 and a pinion carrier PC1 carrying the pinion gears P1, and the second planetary gear unit 16 comprises a sun gear S2, an internal gear R2, pinion gears P2 meshed with both the sun and internal gears S2 and R2 and a pinion carrier PC2 carrying the pinion gears P2. The parts of the first and second planetary units 15 and 16 are arranged in the illustrated manner. The band brake 28 is equipped with both servo-apply and servo-release chambers SA and SR. When the servo-apply chamber SA is fed with a certain hydraulic pressure, the band brake 28 is engaged. When the servo-release chamber SR is fed with the hydraulic pressure, the band brake 28 is disengaged. The servo-release chamber SR has a pressure receiving area larger than that of the servo-apply chamber SA.

The auxiliary speed change mechanism 2 comprises a third planetary gear unit 31, a direct clutch 32 and a reduction brake 33. The third planetary gear unit 31 comprises a sun gear S3, an internal gear R3, pinion gears P3 meshed with both the sun and internal gears S3 and R3, and a pinion carrier PC3 carrying the pinion gears P3. The internal gear R3 is constantly engaged with the internal shaft 14. The internal gear R3 is engageable with the sun gear S3 through the direct clutch 32. The sun gear S3 is engageable with a fixed portion through the reduction brake 33. The pinion carrier PC3 is constantly engaged with an output shaft 35.

In the above-mentioned power transmission mechanism, by operating the clutches 20, 22 and 32, and the brakes 26, 28 and 33 in various combinations, the rotation conditions of the parts of the first, second and third planetary gear units 15, 16 and 31 are changed so that the rotation speed ratio of the output shaft 35 relative to input shaft 13 is changed.

First, Second, Third and Fourth speeds and Reverse of the power transmission mechanism are obtained by operating the clutches 20, 22 and 32 and the brakes 26, 28 and 33 in a manner as shown in FIG. 3. It is to be noted that the mark "O" designates the engaged condition of the corresponding friction element.

Figure 1:
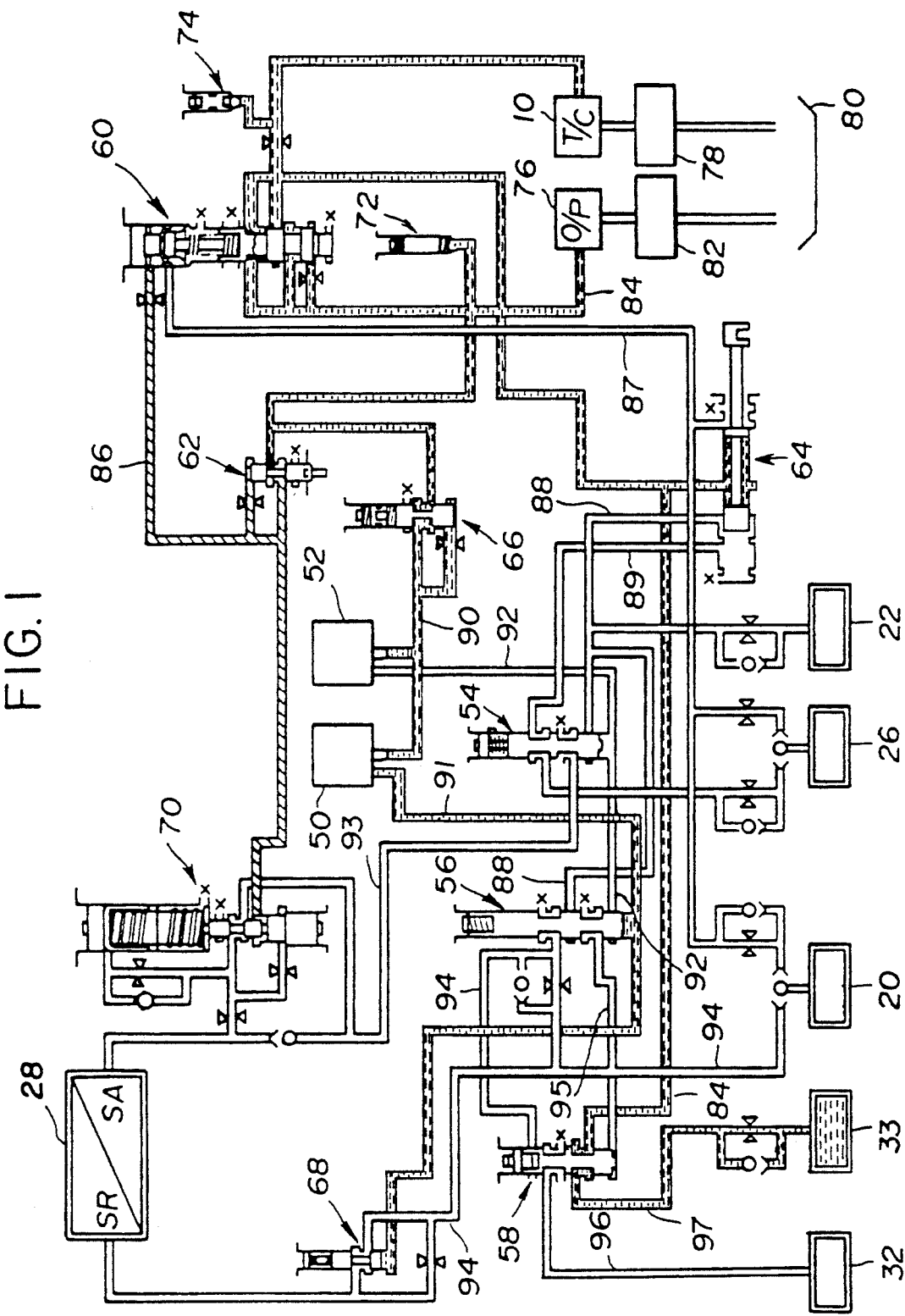
FIG. 1 is a drawing showing a hydraulic circuit employed in the speed change control device of the present invention.

Referring to FIG. 1, there is shown a hydraulic circuit applied to the speed change control device of the invention. The circuit comprises a first solenoid valve 50, a second solenoid valve 52, a 1-2 shift valve 54, a 2-3 shift valve 56 and a 3-4 shift valve 58. The circuit further comprises a line pressure control valve 60, a throttle valve 62, a manual valve 64, a pilot valve 66, a 3-2 timing valve 68, a 1-2 accumulator 70, a line pressure relief valve 72, a torque converter relief valve 74 and an oil pump 76. These parts are connected to one another in the illustrated manner. Furthermore, the servo-apply chamber SA of the band brake 28 and servo-release chamber SR of the same, the direct clutch 32, the reduction brake 33, the high clutch 20, the low-and-reverse clutch 26, the forward clutch 22, the torque converter 10 and an oil cooler 78 are connected in the illustrated manner.

The oil pump 76 sucks through a strainer 82 an oil in a reservoir 80 and discharges the oil into a line pressure oil passage 84. The line pressure control valve 60 adjusts the pressure in the passage 84 in accordance with both a throttle pressure in an oil passage 86 and a back pressure in another oil passage 87. The throttle valve 62 controls the throttle pressure in the oil passage 86 in accordance with an intake vacuum of an associated engine. The manual valve 64 distributes the line pressure in the oil passage 84 to the oil passages 87, 88 and 89 in accordance with its selected position. When R-range (viz., Reverse range) is selected, the line pressure is applied to the oil passage 87, and when D-range (viz., Drive range) or L-range (viz., Low range) is selected, the line pressure is applied to the oil passage 88. When 2-range (viz., second range) is selected, the line pressure is applied to the oil passage 89 as well as the oil passage 88. The pilot valve 66 produces a constant pressure which is fed to an oil passage 90. The 3-2 timing valve 68 controls the discharge of hydraulic pressure from the servo-release chamber SR, and the 1-2 accumulator 70 lightens the hydraulic pressure change in the servo-apply chamber SA.

The first solenoid valve 50, when deenergized, drains the hydraulic pressure from an oil passage 91, and the valve 50, when energized, applies the constant pressure from the oil passage 90 to the oil passage 91. The second solenoid valve 52, when deenergized, drains the hydraulic pressure from an oil passage 92, while, the valve 52, when energized, applies the constant pressure from the oil passage 90 to the oil passage 92. The hydraulic pressure in the oil passage 91 is applied to an end of the 2-3 shift valve 56, and the hydraulic pressure in the oil passage 92 is applied to an end of the 1-2 shift valve 54. The 1-2 shift valve 54 can switch the connection between the oil passage 88 and an oil passage 93. The oil passage 93 is connected through the 1-2 accumulator 70 to the servo-apply chamber SA. The 2-3 shift valve can switch the connection between the oil passage 88 and an oil passage 94 as well as the connection between the oil passage 92 and an oil passage 95. The oil passage 94 is connected to the servo-release chamber SR and the high clutch 20. The hydraulic pressure in the oil passage 95 is applied to an end of the 3-4 shift valve 58. The 3-4 shift valve can switch the connection between the oil passage 94 and an oil passage 96 as well as the connection between the oil passage 84 and an oil passage 97. The oil passage 96 is connected to the direct clutch 32, and the oil passage 97 is connected to the reduction brake 33.

In the following, operation of the speed change control device of the invention will be described with reference to the hydraulic circuit of FIG. 1.

For ease of understanding, the description will be commenced with respect to the first speed assumed by the associated automatic transmission.

Under this condition, both the first and second solenoid valves 50 and 52 are kept energized. Thus, the oil passages 91 and 92 are fed with the hydraulic pressure causing the 1-2 shift valve 54 and 2-3 shift valve 56 to assume the illustrated positions. Because the 2-3 shift valve 56 assumes the illustrated position, the oil passage 95 is not fed with the hydraulic pressure, which causes the 3-4 shift valve 58 to assume the illustrated position. Under this condition, the forward clutch 22 and the reduction brake 33 are fed with the hydraulic pressure, so that the main speed change mechanism 1 takes the highest gear ratio condition and the auxiliary speed change mechanism 2 takes the speed reduction condition. Accordingly, the entire power transmission mechanism assumes the first speed wherein the gear ratio is the highest.

When, under this condition, the second solenoid valve 52 becomes deenergized, the feeding of hydraulic pressure to the oil passage 92 is stopped, so that the 1-2 shift valve 54 is forced to move from the illustrated position to another position wherein the oil passage 88 and the oil passage 93 are connected. Thus, the servo-apply chamber SA is fed with the hydraulic pressure and thus the second speed of the transmission is established. It is to be noted that during this, the 2-3 shift valve 56 and the 3-4 shift valve 58 are kept unchanged.

When now the first solenoid valve 50 becomes deenergized, the feeding of hydraulic pressure to the oil passage 91 is stopped, so that the 2-3 shift valve 56 is forced to switch from the illustrated position to another position wherein the oil passage 88 and the oil passage 94 are connected and the oil passage 92 and the oil passage 95 are connected. Irrespective of the connection between the oil passages 92 and 95, the position of the 3-4 shift valve 58 is not changed because the oil passage 92 is not fed with the hydraulic pressure. The connection between the oil passages 88 and 94, which is induced by the switching of the 2-3 shift valve 56, causes feeding of the hydraulic pressure to both the high clutch 20 and the servo-release chamber SR. Accordingly, the third speed is established.

When, under this condition, the second solenoid valve 52 is energized, the oil passage 92 is fed with the hydraulic pressure, so that the 1-2 shift valve 54 is forced to switch to the illustrated position. Since the oil passage 92 and the oil passage 95 are kept connected through the 2-3 shift valve 56, the hydraulic pressure application to the oil passage 92 induces application of the hydraulic pressure to the oil passage 95, so that the 3-4 shift valve 58 is forced to switch from the illustrated position to another position. Due to this switching of the 3-4 shift valve 58, the feeding of hydraulic pressure to the oil passage 97 is stopped and the hydraulic pressure is fed to the oil passage 96. Accordingly, the direct clutch 32 becomes engaged and the reduction brake 33 is released, so that the auxiliary speed change mechanism 2 takes a direct drive position. Thus, the fourth speed is established. It is to be noted that even though the servo-apply chamber SA becomes fed with the hydraulic pressure due to the switching of the 1-2 shift valve 54 to the illustrated position, the band brake 28 is not engaged because the servo-release chamber SR has been fed with the hydraulic pressure.

Conditions of the solenoids 50, 52, the shift valves 54, 56 and 58, and other hydraulic elements SA, SR, 22, 20, 26, 32 and 33 with respect to the speeds which the transmission assumes are shown in the table of FIG. 4. In the table of FIG. 4, the mark "ON" in the column for each shift valve 54, 56 or 58 represents a condition wherein a corresponding spool of the valve assumes its upper position in FIG. 1 and the mark "OFF" represents a condition wherein the spool assumes its lower position.

As is described hereinabove, the second solenoid valve 52 controls both the 1-2 shift valve 54 and the 3-4 shift valve 58. For this control, only the switching between the oil passages 92 and 95 is needed by the 2-3 shift valve 56. Furthermore, the surplus is only the oil passage 95 extending between the 2-3 shift valve 56 and the 3-4 shift valve 58.

Accordingly, in the present invention, control of the three shift valves 54, 56 and 58 is achieved by the two solenoid valves 50 and 52 without increasing the size of the 2-3 shift valve 56 or increasing the size of needed oil passage 95. That is, the speed change control device of the present invention can have a simple and compact construction, unlike the case of the above-mentioned conventional device.

What is claimed is:

1. A speed change control device for an automatic transmission, comprising:

first, second and third shift valves, each having two switching positions for selectively carrying out application and releasing of hydraulic pressure to and from an oil chamber of a corresponding hydraulically-operated friction element;

first and second solenoid valves, each controlling an output of hydraulic pressure in accordance with an electric signal applied thereto, said first solenoid valve outputting a hydraulic pressure which is applied to said second shift valve to control the switching operation of said second shift valve, said second solenoid valve outputting a hydraulic pressure which is applied to said first shift valve to control the switching operation of said first shift valve; and passage means for permitting application of the hydraulic pressure from said second solenoid valve to said third shift valve to control the switching operation of said third shift valve, said passage means including said second shift valve when said second shift valve assumes a predetermined one of said switching positions to disengage a corresponding hydraulically-operated friction element.

2. A speed change control device as claimed in claim 1, in which said first, second and third shift valves are a 1-2 shift valve, a 2-3 shift valve and a 3-4 shift valve, respectively, and in which one of the hydraulically operated friction elements is a band brake for achieving a second speed.

3. A speed change control device as claimed in claim 2, in which said band brake comprises a servo-apply chamber which, when fed with a hydraulic pressure, induces an engaged condition of said band brake and a servo-release chamber which, when fed with the hydraulic pressure, induces a disengaged condition of said band brake, said servo-release chamber having a pressure receiving area larger than that of said servo-apply chamber, said servo-apply chamber being fed with the hydraulic pressure through said 1-2 shift valve when said second solenoid valve stops outputting, said servo-release chamber being fed with the hydraulic pressure through said 2-3 shift valve when said first solenoid valve stops outputting the hydraulic pressure, and the hydraulic pressure from said second solenoid valve being applied to said 3-4 shift valve when said 2-3 shift valve assumes a position to feed the servo-release chamber with the hydraulic pressure.

4. A speed change control device for an automatic transmission having four forward speeds and one reverse and including a torque converter, a main speed change mechanism and an auxiliary speed change mechanism, said speed change control device comprising:

a band brake installed in said main speed change mechanism, said band brake including a servo-apply chamber which, when fed with a hydraulic pressure, can induce the second speed of the transmission and a servo-release chamber which, when fed with the hydraulic pressure, can induce the third speed of the transmission;

1-2, 2-3 and 3-4 shift valves, each having two switching positions for selectively carrying out application and releasing of hydraulic pressure to and from an oil chamber of a corresponding hydraulically-operated friction element, said 1-2 shift valve having a position in which the servo-apply chamber of said band brake is supplied with a hydraulic pressure;

electrically-actuated first and second solenoid valves, said first solenoid valve outputting a hydraulic pressure which is applied to said 2-3 shift valve to control the switching operation of said 2-3 shift value, said second solenoid valve outputting a hydraulic pressure which is applied said 1-2 shift valve to control the switching operation of said 1-2 shift valve; and passage means for feeding said 3-4 shift valve with the hydraulic pressure from said second solenoid valve to control the switching operation of said 3-4 shift valve only when said 2-3 shift valve assumes a given position in which said servo-release chamber of said band brake is supplied with the hydraulic pressure.

5. A speed change control device as claimed in claim 4, in which said passage means comprises:

first means for defining a first passage which extends between said second solenoid valve and said 2-3 shift valve, said first passage having a portion exposed to one end of said 1-2 shift valve; and second means for defining a second passage which extends between said 2-3 shift valve and said 3-4 shift valve, said first and second passages being connected when said 2-3 shift valve assumes said given position.

6. A speed change control device as claimed in claim 5, in which said servo-release chamber has a pressure receiving area which is larger than that of said servo-apply chamber.

7. A speed change control device as claimed in claim 6, in which said 1-2 shift valve is so arranged as to feed the servo-apply chamber with the hydraulic pressure when said second solenoid valve stops outputting the hydraulic pressure, and in which said 2-3 shift valve is so arranged as to feed the servo-release chamber with the hydraulic pressure when said first solenoid valve stops outputting the hydraulic pressure.

8. A speed change control device for an automatic transmission having four forward speeds and one reverse and including a torque converter, a main speed change mechanism and an auxiliary speed change mechanism, said speed change control device comprising:

a band brake installed in said main speed change mechanism, said band brake including a servo-apply chamber which, when fed with a hydraulic pressure, can induce the second speed of the transmission, and a servo-release chamber which, when fed with the hydraulic pressure, can induce the third speed of the transmission, said servo-release chamber having a pressure receiving area which is larger than that of said servo-apply chamber;

1-2, 2-3 and 3-4 shift valves each having two switching positions for selectively carrying out application and releasing of hydraulic pressure to and from an oil chamber of a corresponding hydraulically-operated friction element, said 1-2 shift valve having a position in which the servo-apply chamber of said band brake is supplied with a hydraulic pressure, electrically-actuated first and second solenoid valves, said first solenoid valve outputting a hydraulic pressure which is applied to said 2-3 shift valve to control the switching operation of said 2-3 shift valve, said second solenoid valve outputting a hydraulic pressure which is applied said 1-2 shift valve to control the switching operation of said 1-2 shift valve; and passage means for feeding said 3-4 shift valve with the hydraulic pressure from said second solenoid valve to control the switching operation of said 3-4 shift valve only when said 2-3 shift valve assumes a given position in which said servo-release chamber of said band brake is supplied with the hydraulic pressure; said passage means including:

first means for defining a first passage which extends between said second solenoid valve and said 2-3 shift valve, said first passage having a portion exposed to one end of said 1-2 shift valve; and second means for defining a second passage which extends between said 2-3 shift valve and said 3-4 shift valve, said first and second passages being connected when said 2-3 shift valve assumes said given position;

wherein said 1-2 shift valve is arranged so as to selectively carry out and stop a hydraulic pressure feeding to a low-and-reverse clutch, said 2-3 shift valve is arranged so as to selectively carry out and stop a hydraulic pressure feeding to a high clutch, and said 3-4 shift valve is arranged so as to selectively carry out and stop a hydraulic pressure feeding to both a direct clutch and a reduction brake.

9. A gear change control device for an automatic transmission having four forward speeds and one reverse, comprising:

1-2, 2-3 and 3-4 shift valves, each having two switching positions for selectively carrying out application and releasing of hydraulic pressure to and from an oil chamber of a corresponding hydraulically-operated friction element;

first and second solenoid valves, each outputting a hydraulic pressure which is controlled in accordance with an electric signal applied thereto, said first solenoid valve outputting a hydraulic pressure to said 2-3 shift valve to control the switching operation of said 2-3 shift valve, and said second solenoid valve outputting a hydraulic pressure to said 1-2 shift valve to control the switching operation of said 1-2 shift valve;

a friction element for the second speed, said friction element including a servo-apply chamber which, when fed with a hydraulic pressure, induces an engaged condition of the second speed friction element, and a servo-release chamber which, when fed with the hydraulic pressure, induces a disengaged condition of the second speed friction element, said servo-release chamber having a pressure receiving area larger than that of said servo-apply chamber;

first passage means for feeding said servo-apply chamber with a hydraulic pressure through said 1-2 shift valve when said second solenoid valve stops the output of a hydraulic pressure therefrom;

second passage means for feeding said servo-release chamber with a hydraulic pressure through said 2-3 shift valve when said first solenoid valve stops the output of a hydraulic pressure therefrom; and third passage means for permitting application of a hydraulic pressure from said second solenoid valve to said 3-4 shift valve to control the switching operation of said 3-4 shift valve only when said 2-3 shift valve assumes a position in which the servo-release chamber of said second speed friction element is fed with the hydraulic pressure.

* * * * *